PACKAGE FOR REACTIVE MULTI-COMPONENT COMPOSITIONS

Filed July 8, 1965

INVENTOR.
KENNETH V. HARDMAN
BY Eyre, Mann & Lucas
his ATTORNEYS

United States Patent Office 3,266,625 Patented August 16, 1966

3,266,625

PACKAGE FOR REACTIVE MULTI-COMPONENT COMPOSITIONS

Kenneth V. Hardman, Upper Montclair, N.J., assignor to H. V. Hardman Co., Incorporated, a corporation of New Jersey Filed July 8, 1965, Ser. No. 470,364
5 Claims. (Cl. 206—56)

This invention relates to a package for reactive liquid multi-component compositions composed of two or more components which are admixed at the time of use to form and activate the compositions. In particular, the invention provides a package for epoxy resin adhesives and other such reactive liquid compositions the components of which much be separated until the time of use due to the limited life of the admixed compositions.

Epoxy resin adhesives are well known materials which, in combining outstanding adhesion, flexibility, chemical resistance, ambient temperature cure and successful adherence to a large number of surfaces, offer superior performance. Such adhesives are made of at least two components, viz., a liquid long chain resin molecule bearing reactive epoxy and sometimes hydroxyl groups, and a so-called curing agent such as a liquid amine, anhydride, polysulfide, etc. which reacts with the epoxy and hydroxyl groups of the liquid resin whereby the admixture of resin and curing agent is converted into a tough, insoluble, infusible solid.

Since the curing reaction begins immediately upon admixture of the resin and curing agent components, epoxy resin adhesives have only a limited useful life in the admixed form and separation of the liquid components is necessary for any amounts in excess of what can be used immediately or shortly after mixing. This fact, compounded by further difficulties resulting from the highly viscous and irritant nature of the components, has led to problems in the use and storage of epoxy resin adhesives. In particular, since the optimum benefits of the adhesives can be realized only by properly admixing correct, measured amounts of the components, and since such measuring and admixing must be carried out in each instance of use by persons who often lack the skill or inclination to give the operation sufficient care and attention, the high potential performance of epoxy resin adhesives in many cases is never achieved due to improper measuring of parts A and B which leads to overcure, undercure, or other unfavorable effects. Notwithstanding the considerable attention that has been devoted to this problem by the prior art and the many different forms of packages that have been proposed, there remains a real need for a reliable, convenient package for epoxy resin adhesives which has sufficient simplicity and facility of use so as to safely secure for all users the maximum performance that is possible with such adhesives, especially in small quantities.

In accordance with the present invention, a new form of package has been developed in which the required separation between two or more components of a reactive multi-component liquid composition, such as epoxy resin adhesives, can be maintained for as long as desired and which also provides a simple, easy way to dispense and admix correct, measured amounts of each component from the package when it is desired to form and activate the composition. This package consists of one or more package units each of which includes a plurality of sealed separate compartments the same in number as the number of components of the composition which is to be stored therein. By filling each compartment with one component, complete separation of all the components is maintained until the time of admixture and use, and the sealing area around and between each compartment in the package unit is made sufficiently strong to be incapable of being opened by hand in such manner as will allow intermixing within the package unit of the contents of any one compartment with the contents of any other of the compartments. In this way, premature curing or activation of the composition through accidental rupture of the sealing areas is prevented. Also, the sealing areas are made of such strength as not to be readily physically separable from each other by hand in order to make certain that the self-sufficient, complete nature of each package unit will always be maintained.

Preferably a plurality of package units are linked together in tandem relationship in the form of a ribbon or tape, and each unit is made readily separable from the adjacent linked unit. Also, the total mixed amount of the reactive multi-component composition provided by each package unit is selected to be the smallest amount which could likely be required by the user or consumer for whom the package is intended. In this way, the user may tear off one or as many more package units as may be necessary for any work at hand and, after the measured amounts of each component have been expelled from the individual compartments of the units, the package units can be conveniently thrown away.

The important point here is that each package unit represents a basic increment of mixed reactive composition formed of accurately proportioned components, and the total amount of each increment is such that it alone, or added to any desired number of additional increments, will be conveniently consumed with each instance of use whereby the package units containing such increments are completely disposable. Also, since in every case the user is required to remove and admix the total contents of each package unit, there is first of all, no opportunity for error in the proportions of components that are mixed and, secondly, there is virtually no opportunity for incomplete mixing since all mixing is done outside the package unit where the components and their degree of admixture can be seen.. The result is a safe, reliable, easy-to-use and virtually "fool-proof" package which provides the maximum benefits and performance of a reactive composition such as an epoxy resin adhesive to any user of the package.

Further details of the invention may be readily understood by reference to the accompanying drawings of which:

Figure 1:
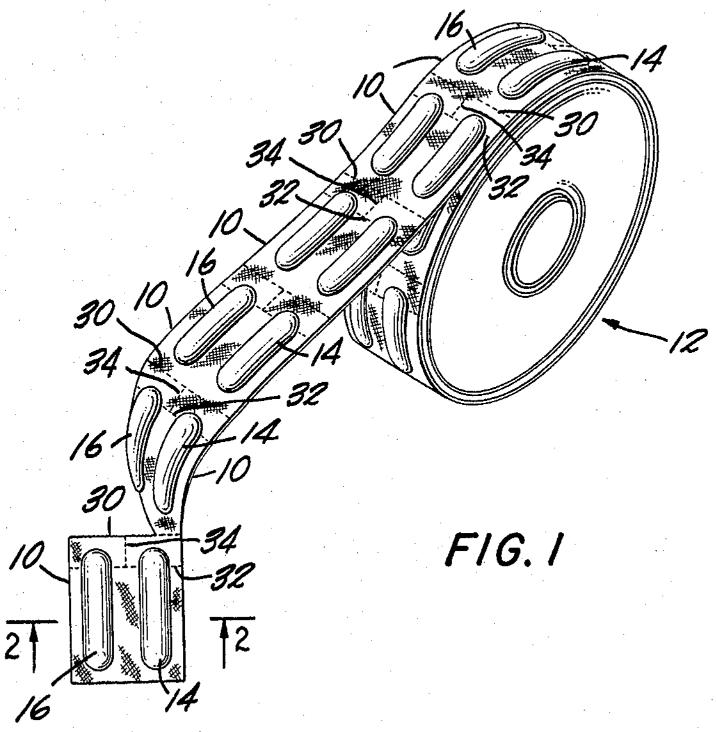
FIG. 1 is a perspective view of a plurality of package units made in accordance with the invention and linked together in tandem relationship.
Figure 2:
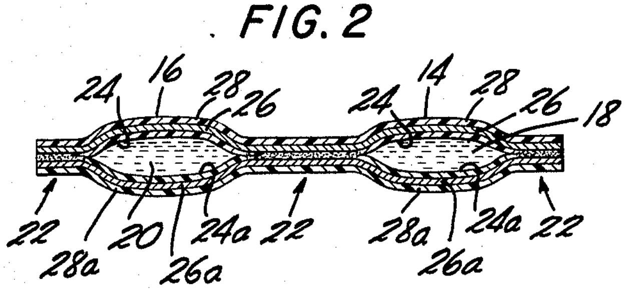
FIG. 2 is a section taken along line 2—2 of FIG. 1.

Referring to FIG. 1, a plurality of package units 10 are there illustrated linked together in the form of a ribbon or tape which is wound up as roll 12. Each package unit 10 is provided with two separated bubble-like compartments 14 and 16 which contain the components of a two-component reactive composition such as an epoxy resin adhesive. For example, referring to FIG. 2, compartment 14 can be filled with a liquid epoxy resin 18 and compartment 16 with a liquid curing agent 20 for the resin. The compartments 14 and 16 are filled with the correct relative proportions of resin and curing agent in each package unit 10, which proportions are well known in the art and need not be set forth in detail here.

As illustrated in FIG. 2, the package units 10 are preferably formed of a laminated construction which is used to prevent any leakage of resin 18 or curing agent 20 out of their respective compartments 14 and 16. In particular, it is very important that areas of seals 22 have sufficient strength to withstand normal and even abnormal handling without bursting or leaking. This is especially true for the central seal 22 located between compartments 14 and 16 since any leakage here will result in intermixing of resin 18 and curing agent 20, whereby premature curing will render the package unit 10 useless. Furthermore, as previously mentioned, in order to preserve the self-sufficient complete nature of each package unit 10, the strength of centrally located seal 22 should be such that the compartments 14 and 16 cannot be readily physically separated by hand.

It has been found that the laminated sandwich construction shown in FIG. 2 best satisfied the above requirements. Such construction includes two inner top and bottom sandwich layers 24 and 24*a*, each approximately 0.001 inch thick and made of flexible, heat sealable plastic material such as polyvinyl chloride or polyvinylidene chloride. Any other plastic material which is fusible by heat or otherwise bondable and which is unaffected by the contents 18 and 20 of the compartments 14 and 16 may be used for the inner top and bottom layers 24 and 24*a*.

Next, there are intermediate top and bottom sandwich layers, 26 and 26*a* respectively, which are made of thin metal foil such as aluminum foil and the like, and which are each also about 0.001 inch thick. Such intermediate layers provide a completely impervious barrier through which the epoxy resin 18 and curing agent 20 cannot pass.

Finally, there are the outer top and bottom sandwich layers 28 and 28*a* which are made of an easily printed plastic material such as cellulose ester and mixed cellulose ester-ether plastics. This makes the package unit 10 readily printable with markings, labels, directions for use, etc.

The package illustrated in the drawings is made in conventional manner. The preassembled bottom half of the laminated sandwich construction, comprising layers 24*a*, 26*a* and 28*a*, and the preassembled top half, comprising layers 24, 26 and 28, are juxtaposed. Next, two U-shaped dies heated to at least the fusion temperature of the inner layers 24 and 24*a* are pressed against opposite sides of the sandwich to form the compartments 14 and 16 with still open tops. The compartments 14 and 16 are then filled with measured volumes of epoxy resin 18 and curing agent 20 by nozzles or similar means. Finally, two additional dies are pressed against the sandwich to complete the areas of seals 22 and close off the compartments 14 and 16 entirely.

As illustrated in FIG. 1, the package units 10 are linked together in tandem and preferably a transverse weakened severance line 30 is provided between the units to facilitate separation of individual package units from the roll 12. Also a severance line 32 extends from the edges and central area of each unit 10 up to but not across one end of the compartments 14 and 16 to facilitate tearing open the compartments so that the contents may be extruded out upon a surface for admixing. In this connection, a short severance line 34 is provided at the center of each package unit 10, parallel to the length of the tandem-linked units 10 and extending from severance line 30 to severance line 32, whereby the tearing open of first one and then the other of the compartments 14 and 16 is facilitated if it should be desired to open the compartments separately rather than simultaneously.

As previously mentioned, the package units 10 are preferably dimensioned to provide the smallest amount of admixed epoxy resin adhesive which may be useful to the intended consumer. For general home use, the smallest package unit 10 should provide at least about ¼ to ½ ounce of admixed adhesive. For commercial use such as repair shops and other small service establishments, the smallest package unit 10 should provide at least about 1 to 1½ ounces of admixed adhesive. Of course, larger package units can be made for the same or other classes of consumers and these will be of advantage where greater amounts of adhesive will be needed on a regular basis.

In using the package of the invention, one or as many as needed of the package units 10 is torn off the roll 12 across severance line 30. The compartments 14 and 16 are then opened separately or at the same time, as may be desired. In the first case, a tear is made along severance line 34 and then across first one of compartments 14 and 16 along half the severance line 32, and then across the other compartment along the remaining half of the severance line 32. For simultaneous opening, a single tear is made across the entire severance line 32. In both cases, the epoxy resin 18 and curing agent 20 are subsequently extruded out from their respective compartments 14 and 16 upon a mixing surface. This may be readily done by placing the package unit 10 upon a flat mixing surface, then pressing a rigid flat blade or stick across the closed end of the compartments 14 and 16, and sliding the blade up towards the torn open ends to expel the resin and curing agent upon the mixing surface.

It is to be particularly noted that in the foregoing description of use of the package unit 10, the epoxy resin and curing agent are dispensed in accurately measured proportions from the package unit which can be immediately thereafter discarded. Next, the resin and curing agent will be admixed upon the mixing surface and the fact that the mixing will be observed right from the beginning is of advantage since the person who is doing the mixing need not guess or estimate as to when the admixing has been completed as is the case with certain conventional packages which are designed to remain closed until the contents have ben premixed. With the package of this invention, the contents of each package unit are easily and thoroughly stripped from the unit to achieve accuracy of proportions, and then admixing is done in full view whereby the reactive epoxy resin adhesive composition can be thoroughly and completely formed to achieve the maximum possible benefits thereof.

While the package of the invention has been described specifically in connection with epoxy resin adhesive composition, it is obvious that the package can be used to advantage for any reactive multi-component liquid compositions the components of which must be maintained separated until the time of use.

It will be understood that it is intended to cover all changes and modifications of the preferred embodiments of the invention, herein chosen for purposes of illustration, which do not depart from the spirit and scope of the invention.

What is claimed is:

1. A package for a reactive liquid multi-component composition which comprises a package unit having a flexible laminated sandwich-like construction, said construction including at least two layers of fusible plastic material, portions of said plastic layers being fused together to form sealing areas and the remaining portions of said plastic layers being spaced apart to form two sealed separate compartments, a reactive liquid epoxy resin contained in one of said compartments and a curing agent for said resin contained in the other of said compartments in predetermined amounts which provide desired proportions of said resin and curing agent relative to the reactive composition which may be formed by admixture thereof, the total amount of both epoxy resin and curing agent in said compartments being from about ¼ to about 1½ ounces, said sealing areas being incapable of being ruptured by hand manipulation of the package unit to allow intermixing of the contents of said compartments within the package unit, whereby said compartments must be severed or otherwise opened and the contents thereof expelled from the package unit in order to be admixed in the desired proportions.

2. A package as in claim 1 wherein a plurality of said package units are linked together in tandem, a weakened severance line between each said tandem-linked package unit to facilitate separating one unit from an adjacent unit by tearing along said severance line, and a second weakened severance line adjacent to but not crossing end portions of said plurality of compartments in each said tandem-linked package unit to facilitate the opening of said end portions by tearing along said second severance line.

3. A package as in claim 1 wherein a layer of thin metal foil is bonded to the exterior surfaces of said layers of plastic material.

4. A package as in claim 3 wherein said layers of plastic material are each about 0.001 inch thick and are made of polyvinyl chloride or polyvinylidene chloride, and wherein said metail foil is about 0.001 inch thick.

5. A package as in claim 4 wherein a layer of printable plastic material is bonded to the exposed outer surface of said metal foil layer, said plastic material being a cellulose ester or a cellulose ester-ether.

References Cited by the Examiner

UNITED STATES PATENTS

| | | | |
|---|---|---|---|
| 2,103,389 | 12/1937 | Salfisberg. | |
| 2,468,517 | 4/1949 | Salfisberg | 206—56 X |
| 2,549,069 | 4/1951 | Donofrio | 206—56 |
| 2,620,939 | 12/1952 | Weisgerber. | |
| 3,056,491 | 10/1962 | Campbell | 206—56 |
| 3,164,695 | 1/1965 | Sanni | 206—56 |

THERON E. CONDON, *Primary Examiner.*

J. M. CASKIE, *Assistant Examiner.*